United States Patent
Ameen et al.

(10) Patent No.: US 7,718,044 B2
(45) Date of Patent: May 18, 2010

(54) METHOD FOR CONTROLLING SHAFT COATING TAPER

(75) Inventors: Mohammad M. Ameen, Cupertino, CA (US); Jerry Weingord, Scotts Valley, CA (US); Thaveesinn Vasavakul, Watsonville, CA (US); Kenneth Cornyn, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 761 days.

(21) Appl. No.: 11/518,275

(22) Filed: Sep. 11, 2006

(65) Prior Publication Data

US 2008/0063328 A1    Mar. 13, 2008

(51) Int. Cl.
   *C23C 14/34*    (2006.01)
   *C23C 16/00*    (2006.01)

(52) U.S. Cl. .......................... 204/192.15; 204/192.16; 204/298.11; 427/282; 118/721

(58) Field of Classification Search ............ 204/192.16, 204/192.15, 298.11; 427/282; 118/721
   See application file for complete search history.

(56) References Cited

U.S. PATENT DOCUMENTS

| | | |
|---|---|---|
| 5,393,572 A | 2/1995 | Dearnaley |
| 5,482,602 A | 1/1996 | Cooper et al. |
| 5,512,330 A | 4/1996 | Dearnaley |
| 5,734,530 A | 3/1998 | Kim |
| 5,879,775 A | 3/1999 | Walter et al. |
| 5,952,060 A | 9/1999 | Ravi |
| 5,965,216 A | 10/1999 | Neuberger et al. |
| 6,046,758 A | 4/2000 | Brown et al. |
| 6,261,693 B1 | 7/2001 | Veerasamy |
| 6,303,226 B2 | 10/2001 | Veerasamy |
| 6,410,125 B1 | 6/2002 | Brenner et al. |
| 6,615,689 B2 | 9/2003 | Kobayashi |
| 6,664,685 B2 | 12/2003 | Ameen et al. |
| 6,692,112 B2 | 2/2004 | Kim et al. |
| 6,713,178 B2 | 3/2004 | Veerasamy |
| 6,888,278 B2 | 5/2005 | Nishimura et al. |
| 6,961,213 B2 | 11/2005 | Ameen et al. |
| 6,961,214 B2 | 11/2005 | Ameen et al. |
| 7,378,771 B2 * | 5/2008 | Leblanc et al. ............... 310/90 |

FOREIGN PATENT DOCUMENTS

JP    2005-269894    * 9/2005

* cited by examiner

*Primary Examiner*—Rodney G McDonald

(57) ABSTRACT

A component of a disc drive has a coating of a predetermined length on its surface, the coating having at least two separate tapered regions applied in independent steps, the at least two separate tapered regions each having a length that is less than the predetermined length of the component surface. When the component is a shaft of a spindle motor, the ends of the shaft are masked before the tapered regions of coating are applied, and the thickness of the masks covering the shaft ends is varied to control a taper of tapered regions.

14 Claims, 5 Drawing Sheets

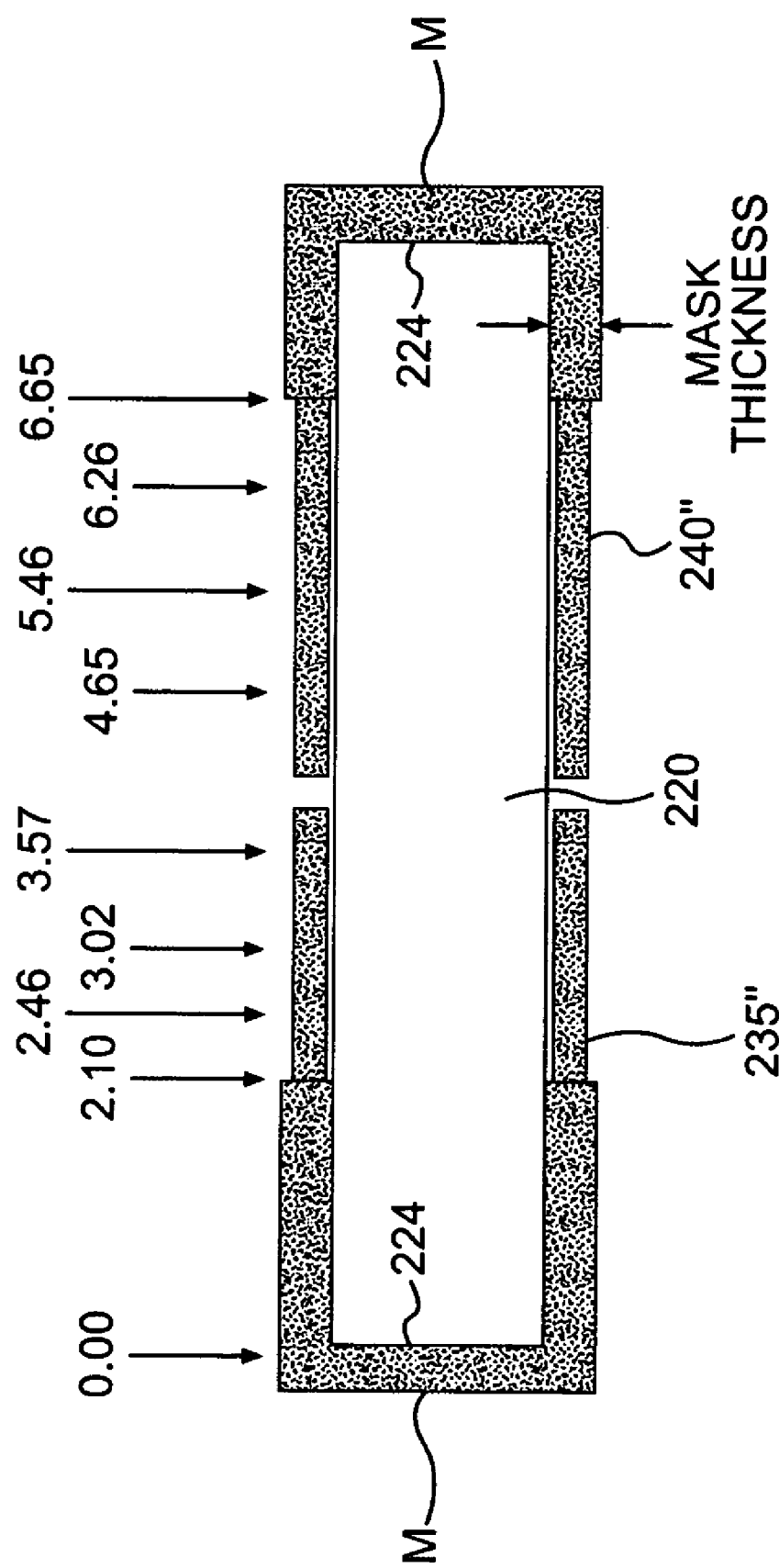

METHOD FOR CONTROLLING SHAFT COATING TAPER

BACKGROUND

The present invention relates to controlling the amount of taper that occurs during shaft coating processes, for example on spindle motor shafts, and more particularly to using a multi-step coating process to control the amount of coating taper during shaft coating processes.

DESCRIPTION OF RELATED ART

Groove regions, such as grooved pumping seal regions, have been used in fluid dynamic bearing (FDB) motors. Some FDB motors have a predominantly straight journal bearing formed by opposing inner and outer surfaces of relatively rotating components. For example, a journal bearing may be formed between an inner surface of a bearing sleeve and an outer surface of a shaft. Such journal bearings are designed to maintain a gap between the inner and outer surfaces. Lubricating liquid is commonly disposed in the gap.

Grooved regions, such as grooved pumping seal regions, are typically disposed at one or both ends of the relatively rotating components. The grooved regions may be for pumping lubricating liquid away from openings from which lubricating liquid may escape and/or evaporate. The grooved regions may also be for establishing a minimum flow of lubricating liquid within portions of the motor. Grooved regions may tend to evacuate lubricating liquid from a portion of the journal, and therefore there is some danger that the relatively rotating components may contact each other if jolted or jarred during operation. Such contact may cause wear in the components and may increase risk of premature drive failure.

Further, hydrodynamic fluid bearings used in FDB motors have tight radial gap tolerances. The dynamic performance of a FDB motor is a function of its gap tolerance. One way to maintain the gap tolerance is to have a suitable pair of relatively rotating components (e.g., shaft and sleeve) that ensures insignificant wear of the components if they contact each other upon being jolted or jarred during operation. This can be achieved by coating the surface of one of the components, and selecting a suitable countersurface for the other component. Sputtered carbon or diamond-like carbon (DLC) is a wear-resistant layer used on high performance spindle motor parts.

Coating a shaft using conventional sputtering processes is a challenge due to thickness variation along the length of the shaft. The thickness variation most commonly creates a taper in the shaft's diameter, with coating thickness being the greatest at a point along a surface that is closest to the sputtering target (source). Coating thickness gradually decreases at points of the surface that are farther from the target, creating the taper. In general, taper increases as the coating length (distance from target) increases and as the coating thickness increases.

FIG. 1 illustrates an exemplary magnetic disc drive storage system 10, including a housing base 12 to which is mounted a spindle motor 14 that rotatably carries storage discs 16. An armature assembly 18 moves transducers 20 across the surface of the discs 16. The environment in which discs 16 rotate may be sealed by seal 22 and cover 24. In operation, discs 16 rotate at high speed while transducers 20 are positioned at any one of a radially differentiated track on the surface of the discs 16. This allows transducers 20 to read and write magnetically encoded information on the surfaces of discs 16 at selected locations. Discs 16 may rotate at many thousands of RPM.

To rotate the discs 16, spindle motor 14 typically includes at least one rotatable portion that is supported by one or more bearing surfaces providing a low friction interface with a relatively non-rotating surface. In some exemplary motors, a shaft may rotate within a journal of a fixed bearing sleeve while in others the shaft may be stationary and the bearing sleeve may rotate about the shaft. Aspects described herein may be used in a variety of motor types, even where described with reference to only one motor type.

FIG. 2 illustrates a cross-section of an exemplary spindle motor 14, including a bearing sleeve 205 with a journal 210 defined by its interior surface (not separately indicated). As illustrated, journal 210 extends from a top 206 of bearing sleeve 205 to a bottom 207 of the motor's cross section. Groove regions 215, 216 are disposed within the journal 210. Groove regions 215, 216 may be asymmetrical and may function as pumping seals and/or to recirculate lubricating liquid through portions of motor 14. A shaft 220 is disposed within journal 210. Shaft 220 includes an outer radial surface 221 (illustrated in FIG. 3) that radially opposes the interior surface of journal 210, to form a gap (not separately indicated) where a hydrodynamic bearing region provides for low friction rotation of shaft 220 in journal 210. The gap between the interior surface and the shaft 220 may vary in size and shape among motor designs.

Shaft 220 may generally be an elongate member with outer radial surface extending from a first end 222 to a second end 224. In some aspects, shaft 220 may be approximately cylindrical, and first end 222 may have an approximately circular first end surface 225. Likewise, second end 224 may have an approximately circular second end surface 226. If desirable, shaft 220 may be crowned or conical (e.g., having a larger diameter at one end) for a journal of a corresponding shape.

An exemplary prior art coated shaft having a taper created by a conventional one-step coating process is illustrated in FIG. 3. The coating typically covers a predetermined length L of the shaft.

SUMMARY

The present invention proposes controlling, preferably for decreasing, the taper of a surface coating by utilizing a multi-step coating process.

The present invention relates to a method for coating a predetermined length of a shaft having first and second ends. The method comprises covering the first end of the shaft with a mask, applying a first length of coating to the shaft from a first target that is located near one of the first or second ends, the first length of coating being shorter than the predetermined length of the shaft, and applying a second length of coating to the shaft from the first target or a second target that is located near the other of the first or second ends, the second length of coating being shorter than the predetermined length of the shaft. A thickness of the mask is varied to control a taper in a thickness of the first length of coating.

The invention also relates to a method for coating a predetermined length of a component of a disc drive. The method comprises applying multiple lengths of coating to the component from at least one target positioned near at least one end of the component, each length of coating being less than the predetermined length of the component. The coating has substantially no taper over the predetermined length of the component.

The present invention further relates to a component of a disc drive has a coating of a predetermined length on its surface, the coating having at least two separate tapered regions applied in independent steps, the at least two separate tapered regions each having a length that is less than the predetermined length of the component surface.

BRIEF DESCRIPTION OF THE DRAWINGS

For describing aspects and examples herein, reference is made to the accompanying drawings in the following description.

FIG. 7 illustrates the effect of mask thickness on coating taper.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. For example, aspects and examples may be employed in a variety of motors, including motors for use in disc storage drives. Motors for disc storage drives may be designed and may operate in a number of ways. Exemplary subject matter provided herein is for illustrating various inventive aspects and is not intended to limit the range of motors and devices in which such subject matter may be applied.

Figure 4:
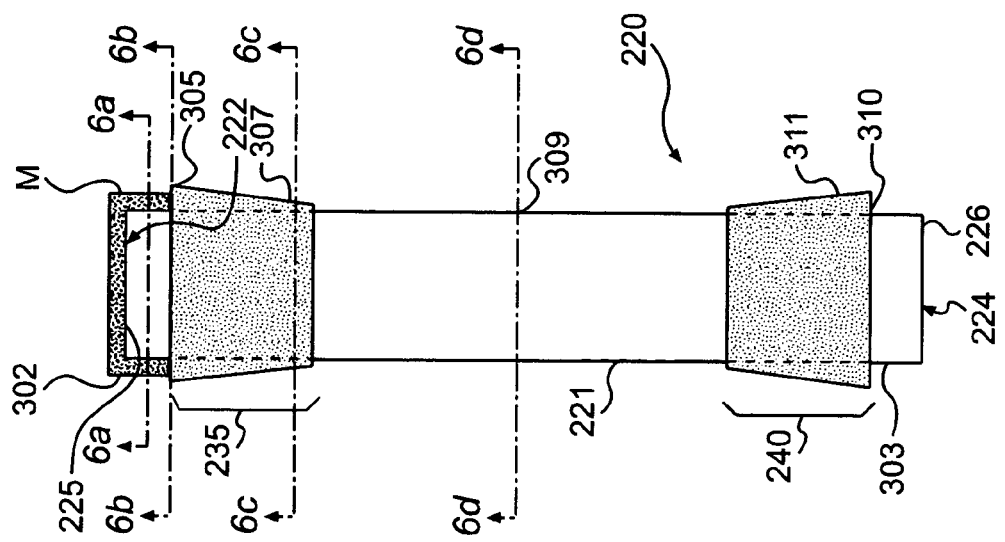
FIG. 4 illustrates a vertical cross section of a shaft coated in accordance with an embodiment of the present invention.

FIG. 4 illustrates an exemplary schematic vertical cross-section of shaft 220 that was coated in accordance with the method of the present invention. This exemplary cross-section is not drawn to scale, so that aspects may be better illustrated. As described above, shaft 220 includes first end 222 and second end 224. Outer radial surface 221 extends from first end 222 to second end 224.

As illustrated in FIG. 4, first coating region 235 may be disposed on outer radial surface 221 proximate first end 222. As illustrated, a portion 302 of outer radial surface 221 remains uncoated, and the coating region 235 is generally thicker near first end 222, becoming thinner toward second end 224. Thus, coating 235 may taper monotonically from near first end 222 towards second end 224. The thickness of coating region 235 near a middle portion 309 of outer radial surface 221 may be negligible. In a preferred embodiment of the invention, a mask M covers first end 222 to prevent a coating from being formed thereon. Additionally, middle portion 309 may be covered with a mask (not shown) to prevent a coating from being formed thereon. When a mask is used, coating region 235 may terminate abruptly near first end 222, as illustrated by shoulder 305.

In accordance with the present invention, the middle portion 309 may have a negligible amount of coating, even when the coating portions 235, 240 extend to meet each other in the central portion of the shaft. Each coating then covers about a half of the predetermined length of the shaft. In a preferred embodiment of the invention, the entire length of the shaft (with the exception of the masked ends) is covered with some amount of coating.

A second coating region 240 may be disposed on outer radial surface 221, proximate second end 224. A portion 303 of outer radial surface 221 remains uncoated (preferably by masking it before coating is applied), and the coating region 240 is generally thicker near second end 224, becoming thinner toward first end 222. Thus, coating 240 may taper monotonically from near second end 224 towards first end 222. The thickness of coating region 240 near the middle portion 309 of outer radial surface 221 may be negligible. A predetermined length L from the shoulder 305 of coating region 235 to the shoulder 310 of coating region 240 is generally the same as the length L of the coating accomplished via conventional one-step coating processes as illustrated in FIG. 3.

In accordance with the present invention, coating the shaft in a two-step process allows coating taper to be controlled so that, for example, it can be reduced to improve radial gap tolerance. In the embodiment illustrated in FIG. 4, a sputtering target would be placed adjacent the first end 222 and the second end 224 for coating, either simultaneously or sequentially. In the case of sequential placement, the same target could be used at both ends of the shaft. The ends would preferably be masked, and the middle portion can also be masked If desirable. In a preferred embodiment of the invention utilizing sequential coating, the process involves applying the first coating 235 in a first process while keeping the rest of the shaft masked so that it is not coated, and then coating the masked half of the shaft in a second process (second coating 240) while making sure the first coating 235 is not coated again.

Figure 1:
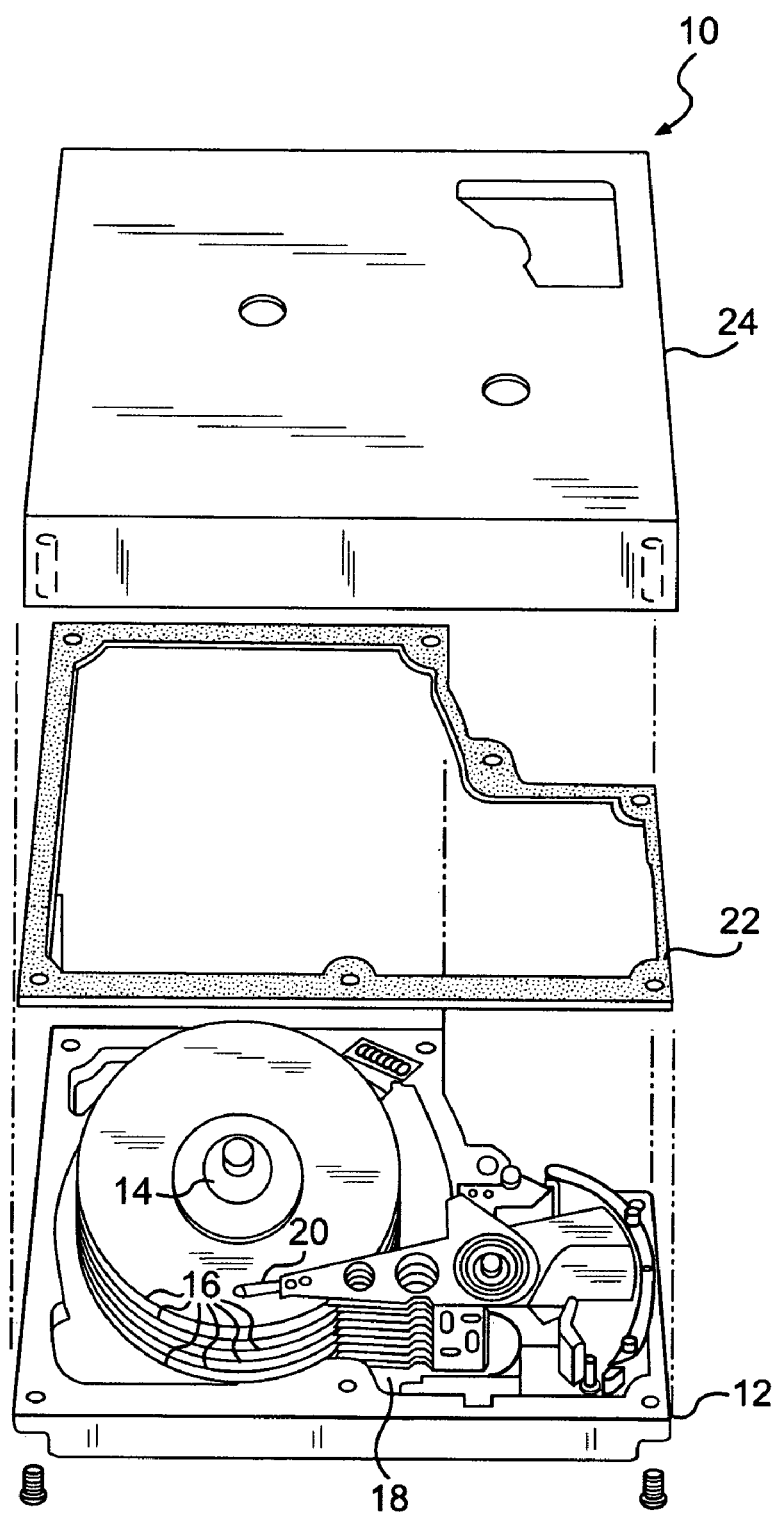
FIG. 1 illustrates a plan view of a conventional disc drive.
Figure 2:
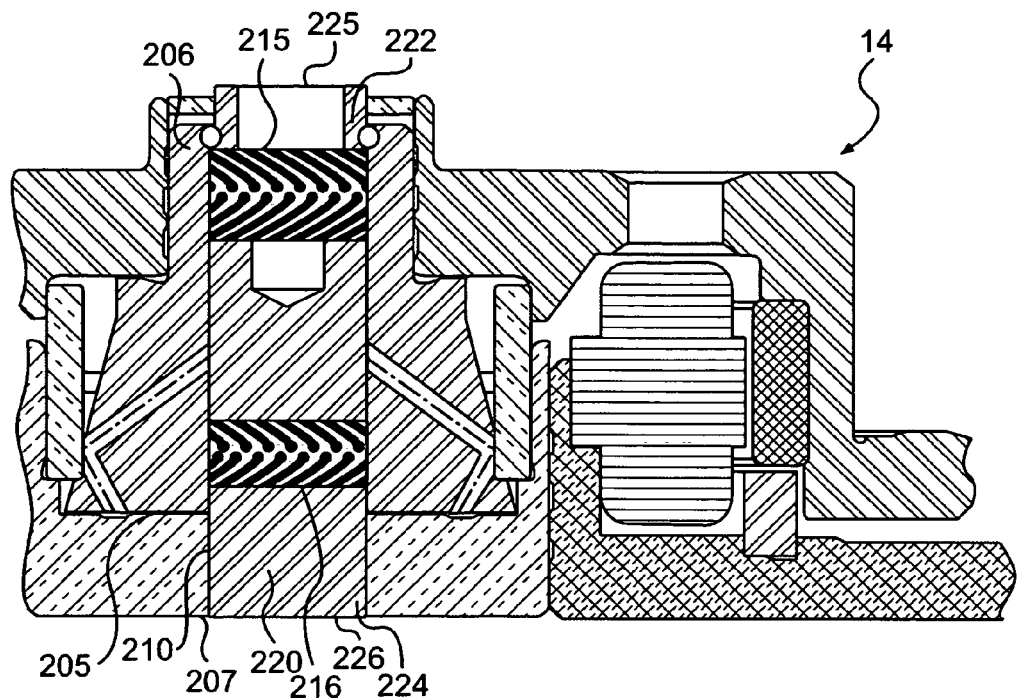
FIG. 2 illustrates a cross-section of a conventional motor having a shaft relatively rotatable with respect to a journal of a bearing sleeve.
Figure 3:
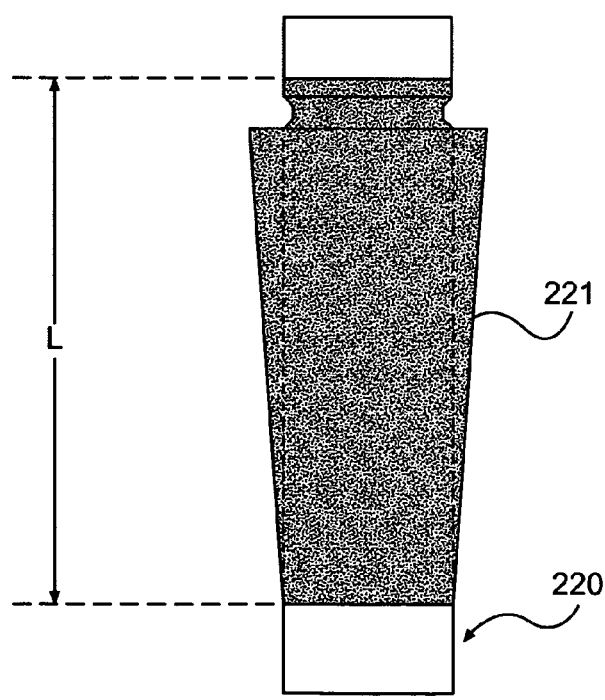
FIG. 3 illustrates a vertical cross section of a shaft coated with a conventional one-step method.

In the prior art coating process shown in FIG. 3, coating from a single source must cover the entire predetermined length L of the shaft. Therefore, a sputtering target located at one end of the shaft must apply enough coating to successfully coat the entire predetermined length L of the shaft. This results in a thicker coating being applied on the unmasked portion of the shaft that is closest to the sputtering target. Thus, the taper increases as coating length increases (i.e., there is a larger difference between the thickness of the coating closest to the source and the thickness of the coating farthest from the source). The present invention allows taper to be reduced by having two shorter coating lengths rather than a single, longer coating length. It is to be understood that the present invention contemplates breaking up the predetermined length L to be coated into any number of coating lengths, which may be applied simultaneously or sequentially.

Figure 5:
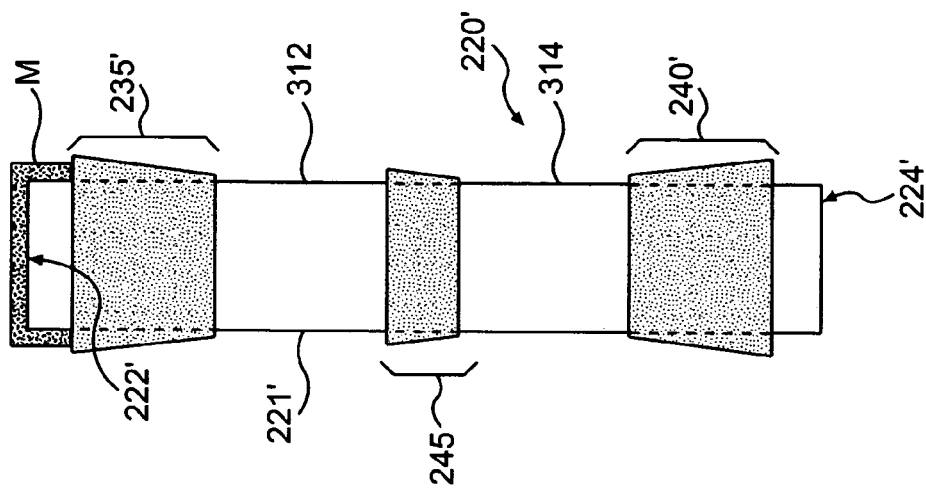
FIG. 5 illustrates a vertical cross section of a shaft coated in accordance with another embodiment of the present invention.

FIG. 5 illustrates an exemplary schematic vertical cross-section of shaft 220 that was coated in accordance with another embodiment of the method of the present invention. In this embodiment, a three-step coating process is utilized. First coating region 235' and second coating region 240' are disposed on outer radial surface 221' proximate the first and second ends 222', 224', respectively. Additionally, at least one additional coating region 245 is located between the first coating region 235' and the second coating region 240'. As illustrated, portions 312, 314 of outer radial surface 221' may have a negligible amount of coating applied, and may even have no coating, and the coating regions 235' 240', 245 are generally thicker near the end at which their sputtering target was located. In a preferred embodiment of the invention, one or more masks (not shown) can be used to cover first end 222', second end 224', and even middle portions 312, 314 to prevent a coating from being formed thereon.

In accordance with the present invention, coating the shaft in a three-step process allows taper to be reduced by providing three shorter coatings rather than one long coating. In the embodiment illustrated in FIG. 5, a sputtering target would be placed adjacent the first end 222' and the second end 224'. The sputtering target adjacent the first end 222' would create the first coating region 235' and the additional coating region 245, and the sputtering target adjacent the second end 224' would create the second coating region 240'. The present invention contemplates alternative placement of the sputtering targets. For example, a single target located at either the first end 222' or the second end 224' could be used to create all of the coating regions 235', 240', 245. As stated above, the ends 222', 224' would preferably be masked.

In a preferred embodiment of the invention utilizing sequential coating, as described above for the two-step process illustrated in FIG. 4, the process involves applying each coating while keeping the rest of the shaft masked. That way, areas that should not be coated will remain uncoated, and each coating region will only be coated a single time.

Figure 6A:
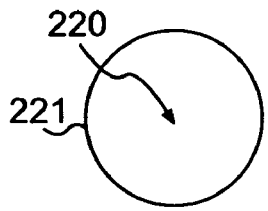
FIGS. 6a-d illustrate cross sections of various portions of the shaft of FIG. 4.

Exemplary cross-sections of the shaft 220 of FIG. 4 with an applied coating are illustrated in FIGS. 6a-d. FIGS. 6a-d are not drawn to scale, but instead are drawn for illustrating various aspects discussed below. FIG. 6a illustrates a portion of shaft 220 proximate first end 222 and substantially without coating. The coating regions 235, 240 may be disposed to make shaft 220 approximately symmetric about a center of the shaft; that is, thicknesses of each coating region may be approximately circumferentially equal at equivalent distances from respective ends of the shaft.

Figure 6B:
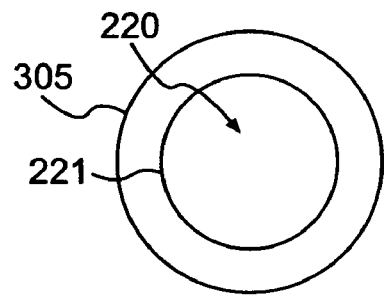

FIG. 6b illustrates a thicker portion of coating region 235, designated as shoulder 305 in FIG. 4. The thicker portion of coating region 240, at shoulder 310 in FIG. 4, preferably looks substantially the same. In FIG. 6b, the approximately annular shape of the cross-section of coating region 235 is evident upon recognizing shaft 220, about which coating region 235 is disposed.

Figure 6C:
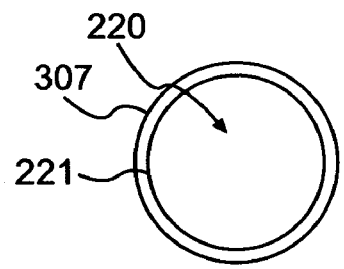
Figure 6D:
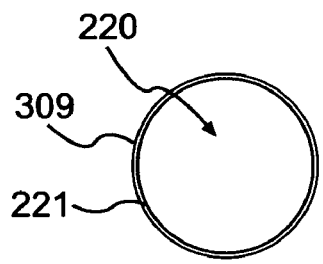

FIG. 6c illustrates a central portion of coating region 235, designated at 307 in FIG. 4. As illustrated, the coating thickness at 307 is thinner than the thickness at 305 (illustrated in FIG. 6b). FIG. 6d illustrates a thinner portion of coating region 235 near the shaft middle 309 (approximately designated). As illustrated, a thickness of coating region 235 at 309 begins to be negligible compared with the diameter of shaft 220. As discussed above, middle portion 309 may be shielded during coating to keep middle portion 309 substantially free from coating. Portions of coating region 240 preferably look substantially the same.

Coating region 235 and coating region 240 preferably comprise a suitable coating material deposited on the outer radial surface 221 of the shaft 220. The present invention contemplates utilizing a physical vapor deposition (PVD) process (sputtering process), and other deposition processes, to coat the shaft.

Coating material may include any variety of suitable material, including diamond-like coating materials and ceramic-type materials. The present invention contemplates a single coating for each coating region, multiple coatings of the same material for each coating region, or multiple separate coatings for each coating region, where each separate coating includes a different material. By example, a first layer of a coating region may be designed to improve adhesion of a later disposed carbon-rich layer. Coating material may also be disposed in numerous coatings, depending on a desired coating thickness and devices used in forming the coating (e.g., some machines may be limited in growth rate per time, or the shaft 220 may be examined during coating deposition).

In one exemplary embodiment of the invention, the coating regions are approximately 0.5-3.0 μm thick at their thickest points and taper uniformly toward a central portion of the shaft. In exemplary aspects, near shaft middle 309 in FIG. 4, coating region 235 and/or coating region 240 are of negligible thickness, for example, less than 0.5 μm. For other background relating to coatings, refer to U.S. Pat. No. 6,664,685, entitled, "HIGH ADHESION, WEAR RESISTANT COATINGS FOR SPINDLE MOTORS IN DISK DRIVE/STORAGE APPLICATIONS," filed on Dec. 13, 2001, which is incorporated in its entirety by reference.

As described briefly above, to establish coating region 235 in FIG. 4, coating material is preferably provided from near first end 222, and to establish coating region 240 in FIG. 4, coating material is preferably provided from near second end 224. By providing the coating material from near the shaft ends in the present invention, a differential in coating thickness may be established through diffusion along outer radial surface 221 from a source of coating material. Thus, in the present invention, the outer radial surface 221 lies substantially parallel to a source direction of coating material (e.g., the general direction of travel of the coating material from the target). Providing coating material from near the shaft ends more easily establishes a desirable taper shape for the coating regions.

The present invention also contemplates controlling coating taper by varying the thickness of the mask M placed over the ends 222, 224 of the shaft 220. FIG. 7 illustrates a shaft 220 having a mask M placed over each end 222, 224 prior to applying coatings 235, 240. The masks M have a thickness as indicated by the arrows. Various distances along the length of the shaft 220 are indicated. Measurement of coating thickness at these distances is discussed below. Studying the effect of two mask thicknesses (100 microns and 250 microns) on resulting coating thickness and taper has shown that a thinner mask applied to an end of the shaft achieves a desired coating thickness at a shorter distance from the mask (and therefore at a shorter distance from the shaft end). In addition, a thicker mask provides a reduced coating taper. Thus, varying the thickness of a mask applied at the ends of the shaft allow the thickness and taper of the adjacent coatings to be controlled.

For example, using a known sputtering target near the shaft end and a mask on each shaft end 222, 224 with a 250 micron thickness, the first coating 235" has the following thicknesses and standard deviations:

| Distance | Average Coating Thickness | Standard Deviation |
| --- | --- | --- |
| 2.10 mm | 0.00036 mm | 0.00009 mm |
| 2.46 mm | 0.00086 mm | 0.00007 mm |
| 3.02 mm | 0.00094 mm | 0.00006 mm |
| 3.57 mm | 0.00090 mm | 0.00006 mm |

Using a mask with a 250 micron thickness, the second coating 240" has the following thicknesses and standard deviations:

| Distance | Average Coating Thickness | Standard Deviation |
| --- | --- | --- |
| 4.65 mm | 0.00081 mm | 0.00009 mm |
| 5.46 mm | 0.00087 mm | 0.00007 mm |
| 6.26 mm | 0.00076 mm | 0.00006 mm |
| 6.65 mm | 0.00023 mm | 0.00006 mm |

Using a mask with a 100 micron thickness, the first coating 235" has the following thicknesses and standard deviations:

| Distance | Average Coating Thickness | Standard Deviation |
| --- | --- | --- |
| 2.10 mm | 0.00063 mm | 0.00012 mm |
| 2.46 mm | 0.00103 mm | 0.00008 mm |

-continued

| Distance | Average Coating Thickness | Standard Deviation |
| --- | --- | --- |
| 3.02 mm | 0.00101 mm | 0.00007 mm |
| 3.57 mm | 0.00095 mm | 0.00007 mm |

Using a mask with a 100 micron thickness, the second coating 240" has the following thicknesses and standard deviations:

| Distance | Average Coating Thickness | Standard Deviation |
| --- | --- | --- |
| 4.65 mm | 0.00084 mm | 0.00007 mm |
| 5.46 mm | 0.00089 mm | 0.00007 mm |
| 6.26 mm | 0.00094 mm | 0.00006 mm |
| 6.65 mm | 0.00055 mm | 0.00015 mm |

Standard deviation is measured as a routine parameter for coating processes.

The present invention contemplates other variations to the coating process, including shielding various portions of the shaft 220 for a portion of the predetermined amount of time and exposing those portions for a remaining time. Further variations may include emitting matter for different amounts of time from each source to establish asymmetrical coatings. Still further variations may include measuring coating thickness during deposition and ceasing provision of matter when a desired thickness has been achieved (in addition to or in place of emitting coating material for the predetermined time). Deposition may also be conducted in numerous discrete time intervals, rather than a single predetermined time. Shaft 220 may be disposed on a stationary holder or a conveyor that moves parallel to the first and/or the second matter source. Other modifications and variations may be apparent to one of skill in the art.

To summarize certain aspects of the invention, a thickness gradient or taper of coating material may be established from first end 222 and extending towards middle portion 309. A similar thickness gradient or taper may be established from second end 224 by either a separate source of coating material or by the same source after coating region 235 has been formed (or vice versa if coating region 240 were formed first). By applying the coating in more than one step, as described in detail above, a coating with substantially no taper over the predetermined length L of a workpiece is achieved.

Other modifications and variations would also be apparent to those of ordinary skill in the art from the exemplary aspects presented. For example, the method of the invention can be applied to coating other types of workpieces that require a controlled coating taper and have a length of surface requiring coating that would benefit from being coated in a two or more smaller lengths. In addition, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve those disadvantages.

We claim:

1. A method for coating a predetermined length of a shaft having first and second ends, comprising:
   covering the first end of the shaft with a mask;
   applying a first length of coating to the shaft from a first target that is located near one of the first or second ends, the first length of coating being shorter than the predetermined length of the shaft;
   applying a second length of coating to the shaft from the first target or a second target that is located near the other of the first or second ends, the second length of coating being shorter than the predetermined length of the shaft; and
   controlling the thickness and taper of the first length of coating by varying the thickness of the mask covering the first end of the shaft.

2. The method of claim 1, wherein the first and second lengths of coating, combined, are less than or equal to the predetermined length.

3. The method of claim 1, wherein the first coating covers substantially a first half of the predetermined length and the second coating covers substantially a second half of the predetermined length.

4. The method of claim 1, wherein the coating comprises a diamond-like material or a ceramic-containing material.

5. The method of claim 4, wherein substantially all of the predetermined length is coated with a diamond-like material.

6. The method of claim 1, wherein the first and second targets are sputtering targets.

7. The method of claim 6, wherein the first coating length is applied adjacent a first end of the shaft by a sputtering target that is located near the first end of the shaft.

8. The method of claim 7, wherein the second coating length is applied adjacent a second end of the shaft by a spattering target located near the second end of the shaft.

9. The method of claim 1, further comprising covering the second end of the shaft with a second mask and controlling the thickness and taper of the second length of coating by varying the thickness of the second mask covering the second end of the shaft.

10. A method for coating a predetermined length of a component of a disc drive, the method comprising:
    covering an end of the component with a mask;
    applying multiple lengths of coating to the component from at least one target positioned near the end of the component, each length of coating being less than the predetermined length of the component, and
    controlling the thickness and taper of applied coating by varying the thickness of the mask covering the end of the component;
    wherein the coating has substantially no taper over the predetermined length of the component.

11. The method of claim 10, wherein the component is a shaft and the step of covering the end of the component comprises masking the end of the shaft near where the target is positioned before applying coating.

12. The method of claim 10, wherein each length of coating is masked prior to applying subsequent lengths of coating.

13. The method of claim 10, wherein the coating comprises a diamond-like material or a ceramic-containing material.

14. The method of claim 13, wherein substantially all of the predetermined length is coated with a diamond-like material.

* * * * *